A. D. PUFFER.
Soda-Water Fountains.
No. 139,734.  Patented June 10, 1873.
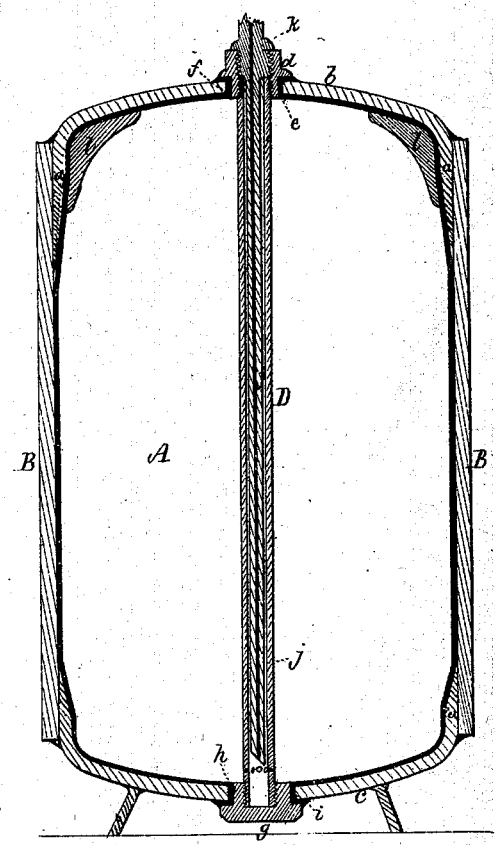
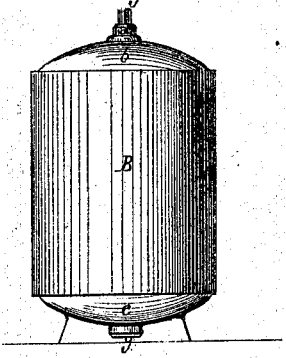

UNITED STATES PATENT OFFICE.

ALVIN D. PUFFER, OF BOSTON, MASSACHUSETTS.

IMPROVEMENT IN SODA-WATER FOUNTAINS.

Specification forming part of Letters Patent No. 139,734, dated June 10, 1873; application filed April 8, 1873.

*To all whom it may concern:*

Be it known that I, ALVIN D. PUFFER, of Boston, Suffolk County, Massachusetts, have invented certain Improvements in Soda-Water Fountains, of which the following is a specification:

My present improvements relate to the construction of soda-water fountains, whereby, with a given weight of metal, I am enabled to obtain greater strength to resist internal pressure than has heretofore been accomplished.

The drawings which accompany this specification exhibit in Figure 1 a side elevation, and in Fig. 2 a longitudinal section, of a soda-water fountain embodying my improvements.

In these drawings, A represents a closed cylinder or drum, whose ends are globular, or of other desirable form, this cylinder constituting the interior shell or lining of the fountain, and being composed preferably of block-tin, in order that no deleterious effects may result from the action of the carbonic acid or other gases with which its contents are charged. B in the drawings represents an open cylinder composed of sheet-iron or other suitable metal, and closed at each end by a head, b or c, of a form to correspond to that of the ends of the inner shell A, the said cylinder, with its heads, tightly inclosing the shell A, as shown in Fig. 2 of the drawings. In the construction of the fountain one head, or that marked b, is inserted a short distance within one open end of the cylinder B, and between its periphery and the tin lining or shell A, and the inner edge of the head thus inserted is to be chamfered off, as shown at a in Fig. 2, in order that the tin lining may not be injured or cut at this corner, as otherwise might result from its being forcibly crowded into it by the force of the gas within the fountain. The head thus inserted, prior to the introduction of the tin lining, is to be properly soldered in its place, and the said lining is then to be placed within the vessel thus formed. The remaining head c is then to be inserted in manner similar to the first, and the joints properly soldered; and in order to retain the tin lining in its original and proper shape, (should it fuse under the effects of the heat necessitated in soldering the last-named head to the outer cylinder,) and in so doing carry out one object of these improvements, I pour into the said lining or shell A a quantity of plaster of Paris diluted with water, and roll the whole about until a certain quantity has deposited itself within the corner about the union of the head c and cylinder B, as shown at l in Fig. 2 of the drawings, and becomes hard or "set." By this means I obtain, as it were, a mold to retain the fused tin in place, should the heat in soldering be of sufficient intensity to melt it, and the plaster-of-Paris mold or protector should be of sufficient extent to more than cover such portion of the tin lining as would be liable to thus fuse. I do not confine myself to the use of plaster of Paris in this connection, as other substances may be employed to give a like result, but whatever substance is used it should be removed after the soldering of the head has been accomplished.

In carrying out another object of these improvements, I dispose within the tin lining or shell A a rod, D, which extends from end to end of such shell, and is confined securely in place at one end thereof by screwing into a tubular cop or coupling, d, which is inserted within a tubular extension or neck, e, of the shell, this neck entering and filling a central orifice, f, created in the adjacent head b, the said coupling d being securely soldered in place. The opposite end of the rod D screws into a plug, g, which is inserted within a tubular neck, h, in which the adjacent end of the shell A terminates, and which enters and fills an orifice, i, created in the head c, this plug being, like the coupling d, securely soldered in place. The outlet-pipe, for escape of the charged water from the fountain, is shown at j, as formed with a plug, k, which screws into the bore of the coupling d, the said pipe j extending to the bottom of the fountain, and being pierced thereat with a number of small holes, through which the contents of the fountain flow into the interior of such pipe. The rod D may be a solid one, and entirely independent of the discharge-pipe j, or it may be tubular and contain the said pipe j, as shown in Fig. 2 of the drawings, the coupling-tube d in this instance being common to the two.

The object of the rod D is to serve the purpose of a stay to bind the two heads of the fountain together, and constitute a powerful means of guarding against longitudinal separation of the two by the expansive force of the gases within the fountain. Heretofore the soldered joint between the head and the outer shell or cylinder has been a weak place in the construction of soda-water fountains, and has necessitated much care. The tension-rod D relieves this joint, as the force of the gases is spent upon it to a very great extent. For these reasons I am enabled to very greatly reduce the thickness of the heads, if composed of copper, as heretofore, or to employ a much less expensive metal, as sheet-iron, for instance; in either event reducing the cost of the fountain very materially, and yet retain all necessary resistance to the power of the gases.

By the mode herein described of uniting the plug $g$ and coupling-thimble $d$ with the fountain I do not break or impair the continuity of the tin lining A, or subject any other portion of the fountain to the action of its contents, which would result in injury, as the ends of said plug and coupling may be tinned, and the rod D and pipe $j$ may be plated or coated with any proper material; or the plug, coupling-rod, and pipe, may be of a composition which the gases will not effect. The pipe $j$ may be dispensed with entirely, if accident or circumstances should render it desirable, as in the event of its disuse the soda-water may be drawn through the outlet of the tubular rod D. E in the drawings represents a suitable orifice in the head of the fountain, through which such fountain may be filled.

The mode herein explained of inserting the edge of each head of the fountain between the inner shell or lining and the outer cylinder, and chamfering off such edge, is a matter of considerable importance, as it prevents cracking of the lining and contamination of the soda-water, which would result from the contact of the latter with the outer cylinder, should fracture of the lining occur at this point, as has heretofore occurred.

The placing of the head within the outer cylinder is productive of another advantage—that is to say, it insures great increase of strength to resist lateral pressure, as a double thickness of metal is presented to bear the strain of such pressure.

I claim as my invention—

1. The employment of plaster of Paris, or an equivalent substance, applied to the interior of the lining or shell A to retain it in proper shape should fusion take place, substantially as and for purposes stated.

2. The combination, with the lining or shell A, of external metallic jacket B, and heads $b$ $c$, the latter being provided with chamfered edges inserted within the part B, substantially as shown and set forth.

3. In combination with the lining or shell A, metallic jacket B, and heads $b$ $c$, the tubular rod or stay D, (with or without pipe $j$,) plug $g$, and thimble $d$, said parts being arranged together, substantially in the manner and for the purposes shown and set forth.

A. D. PUFFER.

Witnesses:
F. CURTIS,
W. E. BOARDMAN.